United States Patent
Brook

(10) Patent No.: US 11,645,421 B2
(45) Date of Patent: *May 9, 2023

(54) SYSTEM AND METHOD FOR GENERATING REVERSIBLE ANONYMIZED RECORD IDENTIFIERS FROM A REMOTE DATA SYSTEM

(71) Applicant: Pitchly, Inc., Des Moines, IA (US)

(72) Inventor: Michael Cory Brook, Des Moines, IA (US)

(73) Assignee: Pitchly, Inc., Des Moines, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/461,368

(22) Filed: Aug. 30, 2021

(65) Prior Publication Data

US 2021/0390211 A1 Dec. 16, 2021

Related U.S. Application Data

(63) Continuation of application No. 16/252,307, filed on Jan. 18, 2019, now Pat. No. 11,106,823.

(51) Int. Cl.
*G06F 21/62* (2013.01)
*G06F 21/60* (2013.01)
(Continued)

(52) U.S. Cl.
CPC ........ *G06F 21/6263* (2013.01); *G06F 16/254* (2019.01); *G06F 16/284* (2019.01);
(Continued)

(58) Field of Classification Search
CPC ............. H04L 63/0428; H04L 63/0281; H04L 63/102; H04L 63/0884; H04L 63/0435;
(Continued)

(56) References Cited

U.S. PATENT DOCUMENTS 7,107,268 B1 9/2006 Zawadzki et al.
8,612,380 B2 12/2013 Kleppner et al.
(Continued)

OTHER PUBLICATIONS

"Airtable Overview", Jan. 3, 2019, 4 pages.
(Continued)

*Primary Examiner* — Tae K Kim
(74) *Attorney, Agent, or Firm* — Polsinelli PC; Kory D. Christensen

(57) ABSTRACT

A data retrieval server includes a non-transitory computer-readable storage medium and at least one processor to execute instructions stored in the non-transitory computer-readable storage medium to extract at least one data value from a record in a remote data store as a primary key that uniquely represents the record in the remote data store; encrypt the primary key using a secret key to create a reversible public identifier that represents the primary key and the record in the remote data store; store the secret key in a local data store associated with the data retrieval server; transmit the reversible public identifier from the data retrieval server to a client computing device; receive the reversible public identifier from the client computing device in a request for data from the record; retrieve the secret key for the record from the local data store; decrypt the reversible public identifier using the secret key from the local data store to determine the primary key; query at least one data value different from the primary key in the remote data store using the primary key; and receive the at least one data value different from the primary key from the remote data store for transmission to the client computing device.

21 Claims, 15 Drawing Sheets

(51) Int. Cl.
*H04L 9/40* (2022.01)
*H04L 9/06* (2006.01)
*G06F 16/28* (2019.01)
*G06F 16/25* (2019.01)
*G06F 40/14* (2020.01)
*G06F 40/174* (2020.01)
*G06F 40/186* (2020.01)
*G06F 8/61* (2018.01)

(52) U.S. Cl.
CPC ........ *G06F 21/602* (2013.01); *G06F 21/6254* (2013.01); *G06F 40/14* (2020.01); *G06F 40/174* (2020.01); *G06F 40/186* (2020.01); *H04L 9/0631* (2013.01); *H04L 63/0428* (2013.01); *G06F 8/61* (2013.01)

(58) Field of Classification Search
CPC . H04L 63/0414; H04L 63/04; H04L 63/0407; H04L 63/0421; H04L 63/045; G06F 21/6218; G06F 21/6254; G06F 21/602
See application file for complete search history.

(56) References Cited

U.S. PATENT DOCUMENTS

| | | | |
|---|---|---|---|
| 8,726,398 B1* | 5/2014 | Tock | H04L 63/0407 726/28 |
| 9,231,920 B1* | 1/2016 | Tock | H04L 63/0421 |
| 9,239,820 B1 | 1/2016 | Marks et al. | |
| 9,361,297 B2 | 6/2016 | Cameron et al. | |
| 9,436,927 B2 | 9/2016 | Saliba et al. | |
| 9,606,968 B2 | 3/2017 | Marks et al. | |
| 9,613,085 B2* | 4/2017 | Ciancio-Bunch | G06F 40/197 |
| 9,679,160 B1* | 6/2017 | Zhang | H04L 9/0894 |
| 9,740,713 B1 | 8/2017 | Greenwood et al. | |
| 9,842,089 B2 | 12/2017 | Marks et al. | |
| 9,928,241 B2 | 3/2018 | Frei et al. | |
| 9,930,092 B2 | 3/2018 | Vegesna-Venkata et al. | |
| 10,146,666 B1* | 12/2018 | Beales | G06F 11/34 |
| 10,733,321 B2* | 8/2020 | Beier | G06F 21/6227 |
| 10,891,282 B1* | 1/2021 | Willingham | G06F 21/64 |
| 2012/0179909 A1* | 7/2012 | Sagi | H04L 9/0872 713/167 |
| 2013/0054968 A1* | 2/2013 | Gupta | H04L 63/083 713/168 |
| 2013/0191650 A1* | 7/2013 | Balakrishnan | G06F 21/6227 713/190 |
| 2013/0262875 A1* | 10/2013 | Garrard | H04L 9/16 707/654 |
| 2015/0149362 A1* | 5/2015 | Baum | G06F 21/602 705/51 |
| 2015/0161199 A1* | 6/2015 | Pinko | G06F 9/4488 707/736 |
| 2015/0310219 A1* | 10/2015 | Haager | H04L 9/0894 713/165 |
| 2015/0356314 A1* | 12/2015 | Kumar | G06F 16/2455 713/165 |
| 2016/0224804 A1* | 8/2016 | Carasso | G06F 16/2322 |
| 2016/0344745 A1* | 11/2016 | Johnson | H04L 41/0803 |
| 2017/0103217 A1* | 4/2017 | Arasu | H04L 9/0819 |
| 2017/0104746 A1* | 4/2017 | Nair | G06F 21/6218 |
| 2017/0116343 A1* | 4/2017 | Wu | G06F 21/6209 |
| 2017/0344646 A1* | 11/2017 | Antonopoulos | H04L 63/205 |
| 2018/0032930 A1* | 2/2018 | Kolb | G06F 40/253 |
| 2018/0150645 A1* | 5/2018 | Toshok | H04L 63/0428 |
| 2018/0278586 A1* | 9/2018 | Driscoll | G06F 21/64 |
| 2018/0336202 A1* | 11/2018 | Jahanbakhsh | G06F 16/248 |
| 2018/0349463 A1* | 12/2018 | Bernhardy | G06F 16/213 |
| 2019/0007206 A1* | 1/2019 | Surla | H04L 63/10 |
| 2019/0156051 A1* | 5/2019 | Beier | G06F 21/602 |
| 2019/0196890 A1* | 6/2019 | Bucchi | G06F 16/951 |
| 2019/0287662 A1* | 9/2019 | Hennie | G16H 10/60 |
| 2019/0303610 A1* | 10/2019 | Bodegas Martinez | G06F 16/152 |
| 2019/0318122 A1* | 10/2019 | Hockey | H04L 63/102 |
| 2019/0340287 A1* | 11/2019 | Tamjidi | G06F 16/242 |
| 2019/0379675 A1* | 12/2019 | Johns | H04L 67/146 |
| 2020/0117745 A1* | 4/2020 | Krishna Pg | G06F 16/284 |
| 2020/0117826 A1* | 4/2020 | Lilly, Jr. | G06F 21/6254 |
| 2020/0204618 A1* | 6/2020 | Agarwal | H04L 63/1458 |

OTHER PUBLICATIONS

"Introduction to GraphQL", Facebook Open Source, Copyright 2019 Facebook Inc., Jan. 4, 2019, 3 pages.

"GraphQL", Current Working Draft, Facebook, Inc., Jan. 4, 2019, 168 pages.

"Smartsheet Product Overview", Collaborative Work Management Tools For The Enterprise, Q4 2018, 9 pages.

Visitacion et al., Oct. 24, 2018, Forrester, The Forrester Wave(TM): Collaborative Work Management Tools For The Enterprise, Q4 2018, "The 10 Providers That Matter Most and How They Stack Up", 14 pages.

* cited by examiner

FIG. 9

SYSTEM AND METHOD FOR GENERATING REVERSIBLE ANONYMIZED RECORD IDENTIFIERS FROM A REMOTE DATA SYSTEM

CROSS-REFERENCE TO RELATED APPLICATIONS

This application is a continuation of U.S. patent application Ser. No. 16/252,307, filed Jan. 18, 2019, for SYSTEM AND METHOD FOR GENERATING REVERSIBLE ANONYMIZED RECORD IDENTIFIERS FROM A REMOTE DATA SYSTEM, which is incorporated herein by reference.

BACKGROUND

In some situations, a user may desire to access and manipulate data available in a network accessible location. The data may be aggregated from one or more sources. However, this can be difficult if the user is not associated with the company or organization that owns and/or manages the data in the database. In addition, it can be difficult to access and manipulate raw databases and there may be a number of security issues when transmitting data from a first computing device to a second computing device via a communication network. As an example, the data in the network accessible location may include confidential or sensitive information that could be unwittingly exposed to third parties that may not be authorized to have access.

It is with these issues in mind, among others, that various aspects of the disclosure were conceived.

SUMMARY

According to one aspect, a system for generating reversible anonymized data record identifiers from a remote data system may include a remote server computing device, a data retrieval server computing device, and a client computing device. The data retrieval server computing device may include a remote data retrieval application that may obtain data values from a database associated with the remote server computing device and transmit the data values to the client computing device.

In one example, a user may use a client computing device to aggregate data from one or more data sources into one or more bases or databases. The user may use a graphical user interface displayed by a browser of the client computing device to view, access, and manipulate data in the base. Each base may be synced with one or more data sources including structured query language (SQL) databases and other types of databases. After syncing with the database, the user can invite one or more users to access the base. As an example, the user can create a document that includes information from the database. The document may be based on a document template and one or more data placeholders that include data that is found in the database. If the data in the database changes, the document is updated automatically. The server computing device may communicate with a remote server computing device that may be in communication with the one or more data sources. The server computing device may obtain one or more data values from the one or more data sources by using a reversible public identifier and submitting queries using a GraphQL application programming interface (API) request.

According to an aspect, a system includes at least one processor to extract at least one data value from a record in a remote data store as a primary key that uniquely represents the record in the remote data store, encrypt the primary key using a secret key and an initialization vector to create a reversible public identifier that represents the primary key and the record in the remote data store, store the secret key and the initialization vector in a local data store and transmit the reversible public identifier at a first instance, receive the reversible public identifier at a second instance after the first instance, decrypt the reversible public identifier using the secret key and the initialization vector from the local data store to determine the primary key, and query at least one data value different from the primary key in the remote data store using the primary key based on a GraphQL application programming interface (API) request, and transmit the at least one data value different from the primary key in the remote data store using the GraphQL API at a third instance after the second instance.

According to another aspect, a method includes extracting, by at least one processor, at least one data value from a record in a remote data store as a primary key that uniquely represents the record in the remote data store, encrypting, by the at least one processor, the primary key using a secret key and an initialization vector to create a reversible public identifier that represents the primary key and the record in the remote data store, storing, by the at least one processor, the secret key and the initialization vector in a local data store and transmitting the reversible public identifier at a first instance, receiving, by the at least one processor, the reversible public identifier at a second instance after the first instance, decrypting the reversible public identifier using the secret key and the initialization vector from the local data store to determine the primary key, and querying at least one data value different from the primary key in the remote data store using the primary key based on a GraphQL application programming interface (API) request, and transmitting, by the at least one processor, the at least one data value different from the primary key in the remote data store using the GraphQL API at a third instance after the second instance.

According to an additional aspect, a non-transitory computer-readable storage medium includes instructions stored thereon that, when executed by a computing device cause the computing device to perform operations, the operations including extracting at least one data value from a record in a remote data store as a primary key that uniquely represents the record in the remote data store, encrypting the primary key using a secret key and an initialization vector to create a reversible public identifier that represents the primary key and the record in the remote data store, storing the secret key and the initialization vector in a local data store and transmitting the reversible public identifier at a first instance, receiving the reversible public identifier at a second instance after the first instance, decrypting the reversible public identifier using the secret key and the initialization vector from the local data store to determine the primary key, and querying at least one data value different from the primary key in the remote data store using the primary key based on a GraphQL application programming interface (API) request, and transmitting the at least one data value different from the primary key in the remote data store using the GraphQL API at a third instance after the second instance.

These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate embodiments and/or aspects of the disclosure and, together with the written description, serve to explain the principles of the disclosure. Wherever possible, the same reference numbers are used throughout the drawings to refer to the same or like elements of an embodiment, and wherein:

FIGS. 4-14 illustrate example user interfaces of a web application displayed by a client computing device according to an example embodiment.

DETAILED DESCRIPTION

Figure 1:
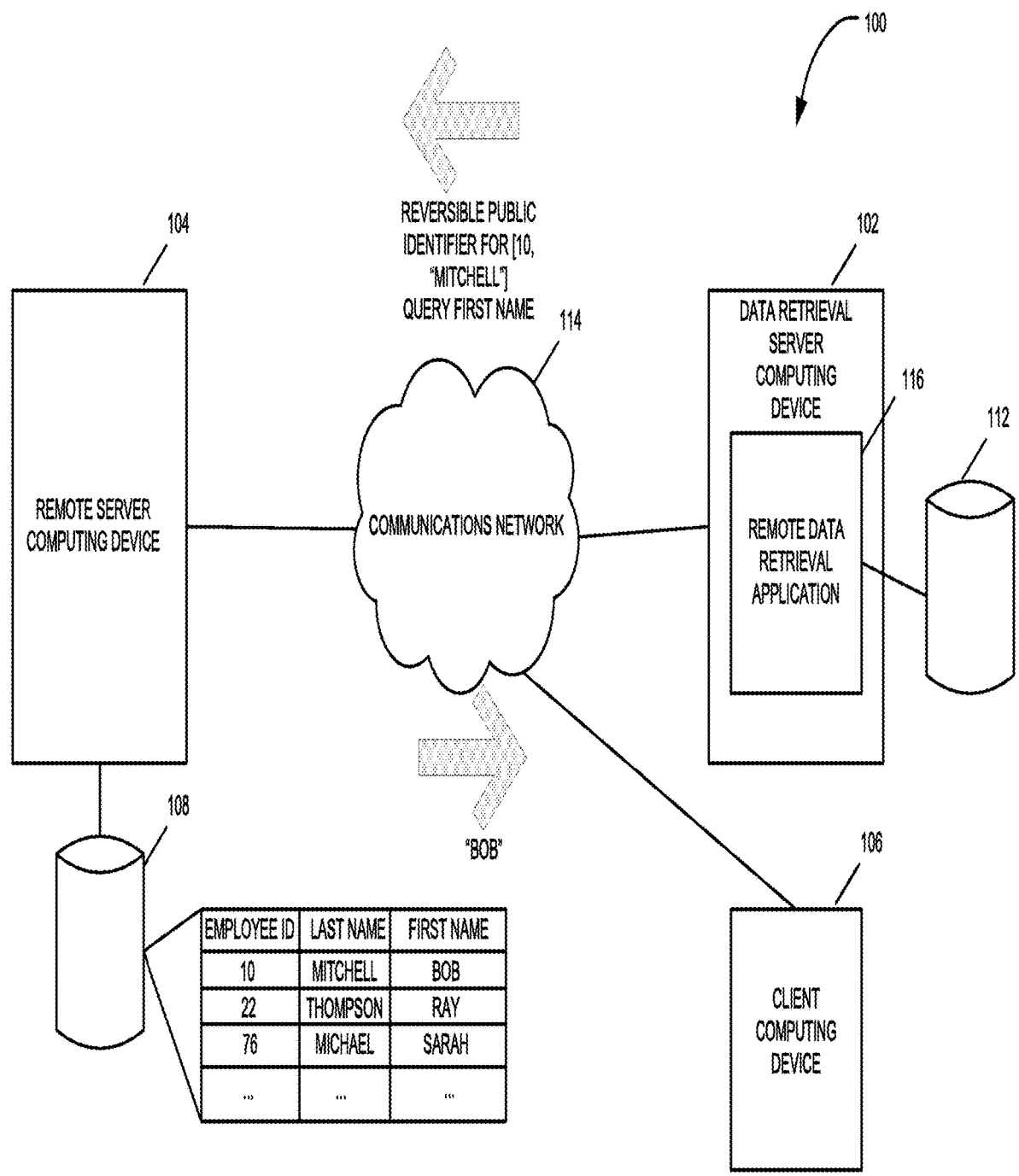
FIG. 1 is a block diagram of a system for generating reversible anonymized record identifiers from a remote data system according to an example embodiment.

Aspects of a system and method for generating reversible anonymized data record identifiers from a remote data system includes a platform as a service (PaaS) that may aggregate data from one or more data sources into one or more bases or databases without creating copies of the one or more data sources and providing security enhancements over conventional solutions. The system and method provide the platform for storing and accessing data by using the reversible anonymized data record identifiers. As an example, customers and employees of a company may access the data quicker and easier using the platform that facilitates connections to software applications while securing access to sensitive data and ensuring the data is up to date.

The PaaS may be used by a user of a client computing device to view, access, and manipulate data in the base using a user-friendly intuitive user interface that provides robust search and permission functionality. Each base may be activated by connecting applications from an application library.

In one example, a user can create a base and select a data source to sync. The user can sync with a structured query language (SQL) database or another type of database. In many instances, the user may be an employee of a company or organization that has created and maintained the SQL database. However, the user may not readily have access to the database or the ability to easily view, edit, and access the data in the SQL database.

Unfortunately, for companies and organizations, there may be many sources of disparate data with no single access point. In addition, the disparate data may have little to no uniformity. Employees of the companies and organizations may lack proper access/availability to the data. The employees may have little to no control over how data may be used and it may be difficult to determine who has access to data. Additionally, the data may be out-of-date and not updated. It can be difficult for a user who is not a software developer, software engineer, database developer, database engineer, or information technology expert to view, access, and manage the data in a database such as a SQL database. It can be more difficult if the user is not associated with the company or organization that owns and/or manages the data in the SQL database.

The system and method disclosed herein provide solutions to these problems and address issues associated with security and safety of the data in the SQL database. As an example, a primary key in the SQL database may be a social security number associated with each employee of an organization. The system and method discussed herein may generate the reversible anonymized data record identifier by encrypting the primary key, e.g., the social security number, which can be sent over a network at a first instance to a computing device for reuse by the computing device. Each employee's social security number does not have to be revealed to provide a unique identifier and a new unique identifier does not have to generated and appended to each subsequent communication. The computing device may transmit the reversible anonymized data record identifier in a request to the database to obtain data values from the database. As a result, a user of the computing device may have access to the SQL database without being provided access to sensitive information in the SQL database. The reversible anonymized data record identifier may identify a particular record in the SQL database without providing access to the underlying data that identifies the record.

The system discussed herein additionally solves problems by allowing a user to create and manage databases, including each database's fields, import and export data to/from databases, manage users and their permissions, and install applications for use with the databases. The system provides a user experience that allows a user with minimal technical know-how to connect to a SQL database that may be pre-existing and install one or more applications such as a document application that allow the user to access and manipulate the data in the SQL database. However, while easily providing the user access, the system does not store the data from the SQL database in a second location or second database. The system may generate a cache that normalizes one or more field types in the SQL database with system database system types, but actual data values are not saved in the cache.

In one example, the user may authenticate to a web-based application over OAuth using a Representational State Transfer (REST) API provided by a first server computing device or data retrieval server computing device and the application may load resources from the databases using a GraphQL API that provides real-time subscriptions to data in the databases that are in communication with a second server computing device or remote server computing device.

In addition to providing access to data in pre-existing databases such as SQL databases as discussed above, the user can create a new database or add additional data to the database and import a file such as a worksheet file, a spreadsheet file (.xlsx) or a comma separated value file (.csv). When first connecting to a pre-existing database such as a SQL database, the user may have to provide appropriate permission credentials such as a user name and a password associated with the SQL database. After syncing with the database, the user can invite one or more users to access the base. As an example, the user can use a web-based application displayed by the client computing device to create a document or form that includes information from the database. The document may be based on a document template and one or more data placeholders that include data that is found in the database. If the data in the database changes, the document is updated automatically.

The system may include a memory and at least one processor to extract at least one data value from a record in a remote data store as a primary key that uniquely represents the record in the remote data store, encrypt the primary key using a secret key and an initialization vector to create a reversible public identifier that represents the primary key and the record in the remote data store, store the secret key and the initialization vector in a local data store and transmit the reversible public identifier at a first instance, receive the reversible public identifier at a second instance after the first instance, decrypt the reversible public identifier using the secret key and the initialization vector from the local data store to determine the primary key, and query at least one data value different from the primary key in the remote data store using the primary key based on a GraphQL application programming interface (API) request, and transmit the at least one data value different from the primary key in the remote data store using the GraphQL API at a third instance after the second instance.

FIG. 1 shows a block diagram of a computing system comprising a reversible anonymized data record identifier system 100 according to an example embodiment. The reversible anonymized data record identifier system 100 includes a data retrieval server computing device 102 that may be in communication with a remote server computing device 104 and at least one client computing device 106 via a communication network 114. The remote server computing device 104 may be in communication with a relational database management system (RDBMS) or another type of database management system that stores and communicates data from at least one database 108. The data retrieval server computing device 102 may be in communication with a RDBMS or another type of database management system that stores and communicates data from at least one database 112.

The at least one database 108 may be a structured query language (SQL) database (e.g., a MICROSOFT AZURE SQL SERVER database), an ORACLE database, a SALESFORCE database, a HUBSPOT database, a WORDPRESS database, a NoSQL database, or a MongoDB database, among others. The at least one database 108 may be integrated with the remote server computing device 104 or in communication with the remote server computing device 104. As an example, the at least one database may be associated with a PaaS. Alternatively, the at least one database 108 may be provided by a service provider such as SALESFORCE. In another example, the database 108 may be a database based on an imported file such as a comma separated value (CSV) file or a spreadsheet file. The data in the spreadsheet file may be migrated into the at least one database 108.

As shown in FIG. 1, the data store in the at least one database 108 may include one or more tables of data having data values. As shown in FIG. 1, as an example, the at least one database 108 includes a table with three columns including an employee ID column, a last name column, and a first name column. A first record or row in the database 108 includes the data values of an employee ID of 10, a last name of Mitchell, and a first name of Bob. A second record or row in the database 108 includes the data values of an employee ID of 22, a last name of Thompson, and a first name of Ray. A third record or row in the database includes the data values of an employee ID of 76, a last name of Michael, and a first name of Sarah. In addition, the database 108 also may store other information.

The at least one database 112 may be a SQL database or another type of database. The at least one database 112 may store a secret key and an initialization vector pair for each table in the database 108, e.g., the example table in the database 108 discussed above. An example secret key may be a string such as "YEIDGz0NhMdJ . . . ." An example initialization vector may be a string such as "AHK4cv39WKFzfZEX . . . ." The secret key and the initialization vector allow the data retrieval server computing device 102 to produce the reversible public identifier that is unique to each record in the database 108. The secret key may be kept private and the initialization vector may or may not be kept private.

In addition, the at least one database 112 and/or the data retrieval server computing device 102 may store a cache that normalizes one or more field types in the at least one database 108 with normalized system field types, but actual data values are not saved in the cache.

Conventionally, the initialization vector may be used as a nonce and it may have a randomly generated value each time encryption takes place. This may provide heightened security in situations where the underlying data may be repetitive. However, this does not solve problems addressed herein. In particular, the data retrieval server computing device 102 has to use stable and non-changing identifiers that may produce the same output for a given input and secret key/initialization vector combination. Thus, the initialization vector may be stored for use long term unlike in conventional network encryption. In addition, the secret key used for encryption and decryption may not be shared with the client computing device 106. The system is able to provide a unique identifier for a given record in a database that may be shared with third parties without revealing the underlying data that may be unique to the record. In addition, the system can re-accept the unique identifier sent by a third party to locate the original record in the database 108 while keeping identifying details of the record secure.

In one example, the data retrieval server computing device 102 may transmit the reversible public identifier to the client computing device 106 and the client computing device 106 may use the reversible public identifier to request data and data values from the remote server computing device 104 and the data from the at least one database 108.

The at least one client computing device 106 is configured to receive data from and/or transmit data to the data retrieval server computing device 102 through the communication network 114. In addition, the data retrieval server computing device 102 is configured to receive data and/or transmit data to the remote server computing device 104 through the communication network 114. Although the data retrieval server computing device 102 is shown as a single server it is contemplated that the data retrieval server computing device 102 may include multiple servers such as in a cloud computing configuration. In addition, although the remote server computing device 104 is shown as a single server it is contemplated that the remote server computing device 104 may include multiple servers such as in a cloud computing configuration.

The at least one client computing device 106 includes at least one processor to process data and memory to store data. The processor processes communications, builds communications, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions such as a browser application that may display a user interface provided by a remote data retrieval application 116 executed by the data retrieval server computing device 102. In addition, the at least one client computing device 106 further includes at least one communications interface to transmit and receive communications, messages, and/or signals.

The at least one client computing device 106 can be a laptop computer, a smartphone, a personal digital assistant, a tablet computer, a standard personal computer, or another processing device. The at least one client computing device 106 may include a display, such as a computer monitor, for displaying data and/or graphical user interfaces. The at least one client computing device 106 may also include an input device, such as a camera, a keyboard or a pointing device (e.g., a mouse, trackball, pen, or touch screen) to enter data into or interact with graphical and/or other types of user interfaces. In an exemplary embodiment, the display and the input device may be incorporated together as a touch screen of the smartphone or tablet computer. In addition, the at least one client computing device 106 further includes at least one communications interface to transmit and receive communications, messages, and/or signals.

The at least one client computing device 106 may display on the display a graphical user interface (GUI). The graphical user interface may be provided by the remote data retrieval application 116 and displayed by a browser on the display. The graphical user interface enables a user of the at least one client computing device 106 to interact with the remote data retrieval application 116.

The at least one data retrieval server computing device 102 includes at least one processor to process data and memory to store data. The processor processes communications, builds communications, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions such as a portion or a component of the remote data retrieval application 116.

The at least one remote server computing device 104 includes at least one processor to process data and memory to store data. The processor processes communications, builds communications, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions such as a portion or a component of the remote data retrieval application 116.

The communication network 114 can be the Internet, an intranet, or another wired or wireless communication network. For example, the communication network 106 may include a Mobile Communications (GSM) network, a code division multiple access (CDMA) network, 3$^{rd}$ Generation Partnership Project (GPP) network, an Internet Protocol (IP) network, a wireless application protocol (WAP) network, a WiFi network, a Bluetooth network, a satellite communications network, or an IEEE 802.11 standards network, as well as various communications thereof. Other conventional and/or later developed wired and wireless networks may also be used.

The remote data retrieval application 116 may be a component of an application and/or service executable by the at least one data retrieval server computing device 102 and/or the at least one client computing device 106. For example, the remote data retrieval application 116 may be a single unit of deployable executable code or a plurality of units of deployable executable code. According to one aspect, the remote data retrieval application 116 may include one component that may be a web application, a native application, and/or a mobile application (e.g., an app) downloaded from a digital distribution application platform that allows users to browse and download applications developed with mobile software development kits (SDKs) including the App Store and GOOGLE PLAY®, among others.

Figure 2:
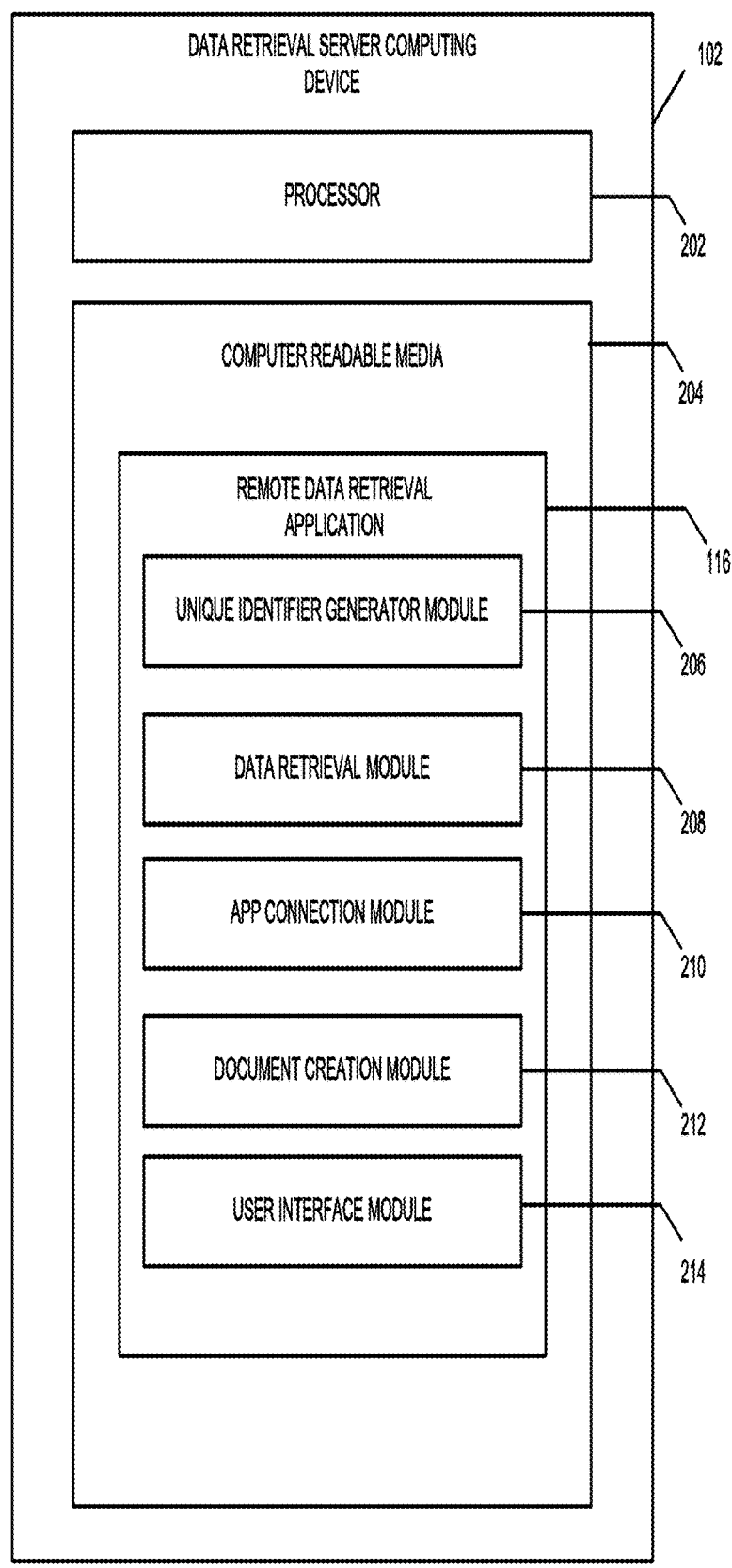
FIG. 2 shows a block diagram of a server computing device of the system according to an example embodiment.

FIG. 2 illustrates a block diagram of the data retrieval server computing device 102 according to an example embodiment. The data retrieval server computing device 102 includes at least one processor 202 and computer readable media (CRM) 204 in memory on which the remote data retrieval application 116 or other user interface or application is stored. The computer readable media 204 may include volatile media, nonvolatile media, removable media, non-removable media, and/or another available medium that can be accessed by the processor. By way of example and not limitation, the computer readable media 204 comprises computer storage media and communication media. Computer storage media includes non-transitory storage memory, volatile media, nonvolatile media, removable media, and/or non-removable media implemented in a method or technology for storage of information, such as computer/machine-readable/executable instructions, data structures, program modules, or other data. Communication media may embody computer/machine-readable/executable instructions, data structures, program modules, or other data and include an information delivery media or system, both of which are hardware.

The remote data retrieval application 116 may be connected to a pre-existing database such as the at least one database 108 by providing authentication information such as a user name and a password for accessing the at least one database 108. After providing this authentication information, the remote data retrieval application 116 may communicate, authenticate, and connect with the at least one database 108 and obtain information and data from the at least one database 108.

The remote data retrieval application 116 includes a unique identifier generator module 206 for generating a reversible public identifier that represents a primary key associated with a record in the database 108. In one example, after providing the authentication information, the unique identifier generator module 206 may determine a primary key in a remote data store such as the database 108 associated with the remote server computing device 104. At least one data value associated with the primary key is extracted and may be placed into an array that includes the at least one data value. As an example, a primary key for a record in the database 108 may include an employee ID and a last name. For example, a primary key for the record in the database may be an array of [10, "Mitchell"]. The array may be converted into a JSON UTF-8 encoded text value of plaintext to prepare for encryption.

Next, the unique identifier generator module 206 may encrypt the primary key using a secret key and an initialization vector to create a reversible public identifier, e.g., ciphertext, unique to the record in the remote data store. The initialization vector and/or the secret key may be stored in the database 112 and retrieved by the unique identifier generator module 206 from the database 112 for use in encryption. The JSON encoded text value may be encrypted using Advanced Encryption Standard (AES) encryption or another symmetric encryption algorithm. As an example, the encryption may be AES-256 encryption.

As an example, the secret key may be a string of characters or another format that begins with "YEIDGz0NhMdJ . . . ." The initialization vector may be a string of characters or another format that begins with "AHk4cv39WKFZEX . . . ." The secret key and the initialization vector may be randomly generated and may have sufficient entropy to make reproducibility difficult for third parties.

As an example, the reversible public identifier for the employee having an employee ID of 10 and a last name of Mitchell may be a string of characters or another format such as "G74G0Aqt4hhRr8DvntncAg==." Thus, the record having the first name of "Bob" now has a reversible public identifier that is unique to this record and the identifying data, e.g., the primary key is not public.

```
{
    _id: "G74G0Aqt4hhRr8DvntncAg==", // reversible public
    identifier
    First_Name: "Bob"
}
```

The reversible public identifier for the employee having an employee ID of 22 and a last name of Thompson may be a string of characters or another format such as "yB/SzN2KaBcPqaDxVP;Mag==." This record having the first name of "Ray" has a reversible public identifier that is unique to this record and the identifying data, e.g., the primary key is not public.

```
{
    _id: "yB/SzN2KaBcPqaDxVP;Mag==", // reversible public
    identifier
    First_Name: "Ray"
}
```

The reversible public identifier for the employee having an employee ID of 76 and a last name of Michael may be a string of characters or another format such as "YAtmM1pc1CQTWVKN4J6FwA==." This record having the first name of "Sarah" has a reversible public identifier that is unique to this record and the identifying data, e.g., the primary key is not public.

```
{
    _id: "YAtmM1pc1CQTWVKN4J6FwA==", // reversible public
    identifier
    First_Name: "Sarah"
}
```

In the event that the encryption produces non-printable characters, the associated bytes may be converted to printable characters and the printable characters, or a transformation of the printable characters, may be inserted into a finalized data representation such as a JavaScript Object Notation (JSON) document that may be transmitted via the communication network 114. The unique identifier generator module 206 may transmit the reversible public identifier in the JSON document to the client computing device 106 for use in the future to retrieve and obtain information from the database 108 such as at least one data value associated with a particular record or row in a table in the database 108.

The remote data retrieval application 116 also includes a data retrieval module 208 for retrieving data and data values from the database 108. In one example, the data retrieval module 208 may use the reversible public identifier to obtain at least one data value different from the primary key. The data retrieval module 208 may receive a request for one or more data values from the client computing device 106. The request may include the reversible public identifier. The data retrieval module 208 may decrypt the reversible public identifier using the secret key and the initialization vector stored in the database 112. After decrypting the reversible public identifier to determine the primary key, the data retrieval module 208 may query the at least one data value different from the primary key and transmit the at least one data value different from the primary key to a recipient, e.g., the client computing device 106. In one example, the data retrieval module 208 may send a GraphQL application programming interface (API) request to the remote server computing device 104 that indicates the data and the data values that are desired in the query.

GraphQL is a query language and execution engine that was originally developed by FACEBOOK in 2012 that describes capabilities and requirements of data models for client-server applications. GraphQL provides a way for the remote data retrieval application 116 to provide an intuitive and flexible syntax and system to obtain data from data sources such as the database 108. GraphQL is a language that may be used to query servers such as the data retrieval server computing device 102 and the remote server computing device 104. In one example, the data retrieval server computing device 102 may provide a GraphQL service that receives and makes requests. A request may include a document that includes operations such as queries, mutations, and subscriptions to data. A GraphQL document may be expressed as a sequence of Unicode characters.

GraphQL provides the system 100 the flexibility to retrieve data from a multitude of data sources, which may include database systems or other API services. It also allows the system 100 to abstract more complex processes not included in traditional REST APIs, such as the ability to deliver updates when the underlying data being queried changes over time. This is known as a Publish/Subscribe data retrieval model, and it provides real-time functionality.

The remote data retrieval application 116 includes an app connection module 210 for connecting to an application associated with the database 108. In one example, a user of the client computing device 106 may connect the database 108 to an application from an application library such as a document application, a form application, or an Insights application among other applications. The application library may include third-party applications that may be submitted by third-parties and users. Each application acts as a micro-service that can be installed or applied to an associated database, managed, and deleted.

In one example, the app connection module 210 may transmit data and resources to the client computing device 106 and the client computing device 106 may display a graphical user interface that allows the user to connect the application to the database 108. The application may utilize one or more data values in the database 108 to generate a document having the one or more data values in the database 108 or generate a form having the one or more data values in the database 108.

The remote data retrieval application 116 includes a document creation module 212 for creating a document that is associated with an application. In one example, after the user of the client computing device 106 connects the database to the application, the user can create a document. The document may be based on a template that includes at least one data placeholder for the at least one data value different from the primary key in the database 108. One or more of the data placeholders may be associated with a subscription to changes in data associated with the one or more data placeholders. The changes may be applied rapidly, in real-time, or near real-time. The document creation module 212 can determine a change in the at least one data value different from the primary key in the database 108 and transmit the change in the at least one data value different from the primary key in the database 108 using the GraphQL API. When changes are detected, the changes may be applied to the at least one data placeholder. The document creation module 212 may perform polling and may detect a trigger in the database 108 that indicates that there is a change in the at least one data value different from the primary key. When the trigger is detected, the changes may be applied.

The user may design and organize a layout for the document template that is used to provide the document. The client computing device 106 may display the graphical user interface that allows the user to select a location on the document for each of the one or more placeholders for the at least one data value different from the primary key. In addition, the user may insert one or more static text fields, one or more images, and other graphics on the document. The user also may set a font color, a particular font type, and a font size of the one or more static text fields and the one or more placeholders for the at least one data value different from the primary key. In addition, if the at least one data value is an image, the user may set dimensions of the image.

The remote data retrieval application 116 includes a user interface module 216 for transmitting a user interface to the client computing device 106 to be displayed on the display. As an example, the user interface module 216 generates a native and/or web-based graphical user interface (GUI) that accepts input and provides output viewed by users of the client computing device 106. The client computing device 106 may provide realtime automatically and dynamically refreshed information such as data and data values from the database 108. The user interface module 216 may send data to other modules of the remote data retrieval application 116 of the data retrieval server computing device 102, and retrieve data from other modules of the remote data retrieval application 116 of the server computing device 102 asynchronously without interfering with the display and behavior of the user interface displayed by the client computing device 106.

Figure 3:
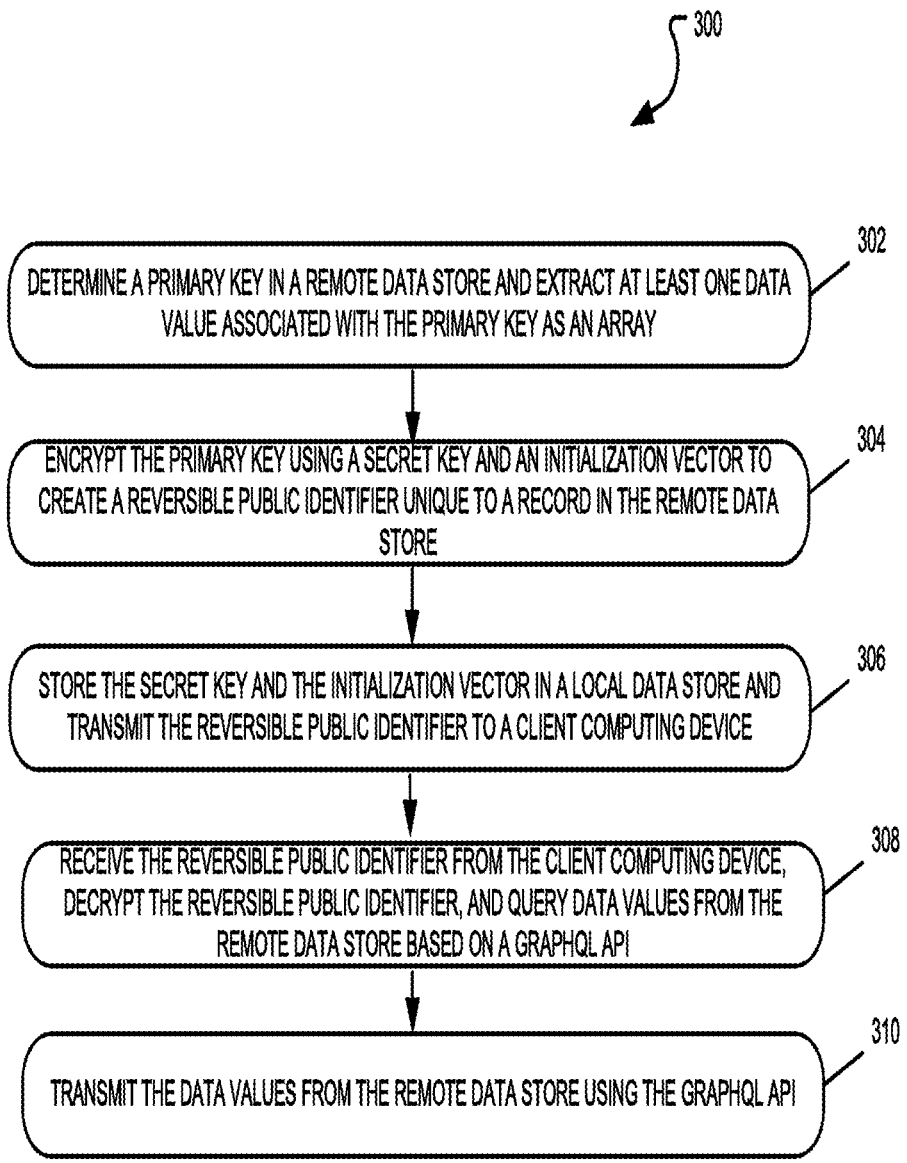
FIG. 3 illustrates a flowchart for generating reversible anonymized record identifiers from a remote data system according to an example embodiment.

FIG. 3 illustrates a flowchart of a process 300 for generating reversible anonymized record identifiers from a remote data system according to an example embodiment. In a first step 302, the remote data retrieval application 116 of the data retrieval server computing device 102 may determine a primary key in a remote data store such as the database 108 associated with the remote server computing device 104. At least one data value associated with the primary key is extracted and may be placed into an array that includes the at least one data value. As an example, a primary key for a record in the database 108 may include an employee ID and a last name.

Next, in step 304, the remote data retrieval application 116 of the data retrieval server computing device 102 may encrypt the primary key using a secret key and an initialization vector to create a reversible public identifier unique to the record in the remote data store. The remote data retrieval application 116 may use AES or another encryption algorithm. As an example, the secret key may be a string of characters or another format that begins with "YEIDG-zONhMdJ . . . ." The initialization vector may be a string of characters or another format that begins with "AHk4cv39WKFZEX . . . ." As an example, the reversible public identifier for the employee having an employee ID of 10 and a last name of Mitchell may be a string of characters or another format such as "G74G0Aqt4hhRr8DvntncAg==."

In step 306, the remote data retrieval application 116 of the data retrieval server computing device 102 may store the secret key and the initialization vector in a local data store such as database 112 in order to decrypt the reversible public identifier at a later time. Next, the remote data retrieval application 116 of the data retrieval server computing device 102 may transmit the reversible public identifier at a first instance in time to the client computing device 106 for use in future data requests from the database 108.

In step 308, the remote data retrieval application 116 of the data retrieval server computing device 102 may receive the reversible public identifier from the client computing device 106 at a second instance in time after the first instance in time and decrypt the reversible public identifier using the secret key and the initialization vector. The remote data retrieval application 116 of the data retrieval server computing device 102 may query at least one data value different from the primary key in the remote data store using the primary key based on a GraphQL application programming interface (API) request.

Next, in step 310, at a third instance in time after the second instance in time, the remote data retrieval application 116 of the data retrieval server computing device 102 may transmit the at least one data value different from the primary key in the remote data store using the GraphQL API. The remote data retrieval application 110 does not have to re-transmit the reversible public identifier.

As an example, the at least one data value different from the primary key may be the first name associated with the primary key, "Bob." The remote data retrieval application 116 may display the at least one data value different from the primary key on a display of the client computing device 106 on the graphical user interface. In addition, the remote data retrieval application may insert the at least one data value different from the primary key in a document or a form. The document may be based on a template that includes at least one data placeholder for the at least one data value different from the primary key.

Figure 4:

FIG. 4 shows an example user interface 400 generated by the remote data retrieval application 116 and transmitted from the data retrieval server computing device 102 to the client computing device 106 and displayed by the client computing device 106. In one example, the remote data retrieval application 116 may be a web application executed by the data retrieval server computing device and having a graphical user interface displayed by the browser of the client computing device 106. As shown in FIG. 4, a user of the client computing device 106 may create a new database (e.g., a base) and import data from an existing file such as a CSV file. The user can import the data or start from scratch. As shown in FIG. 4, the user can name the database and provide a description for the database.

Alternatively, the user of the client computing device 106 may connect to an existing database such as a SQL database. The data may be stored in database 108 or in another location. The remote data retrieval application 116 may sync with the database 108.

Figure 5:
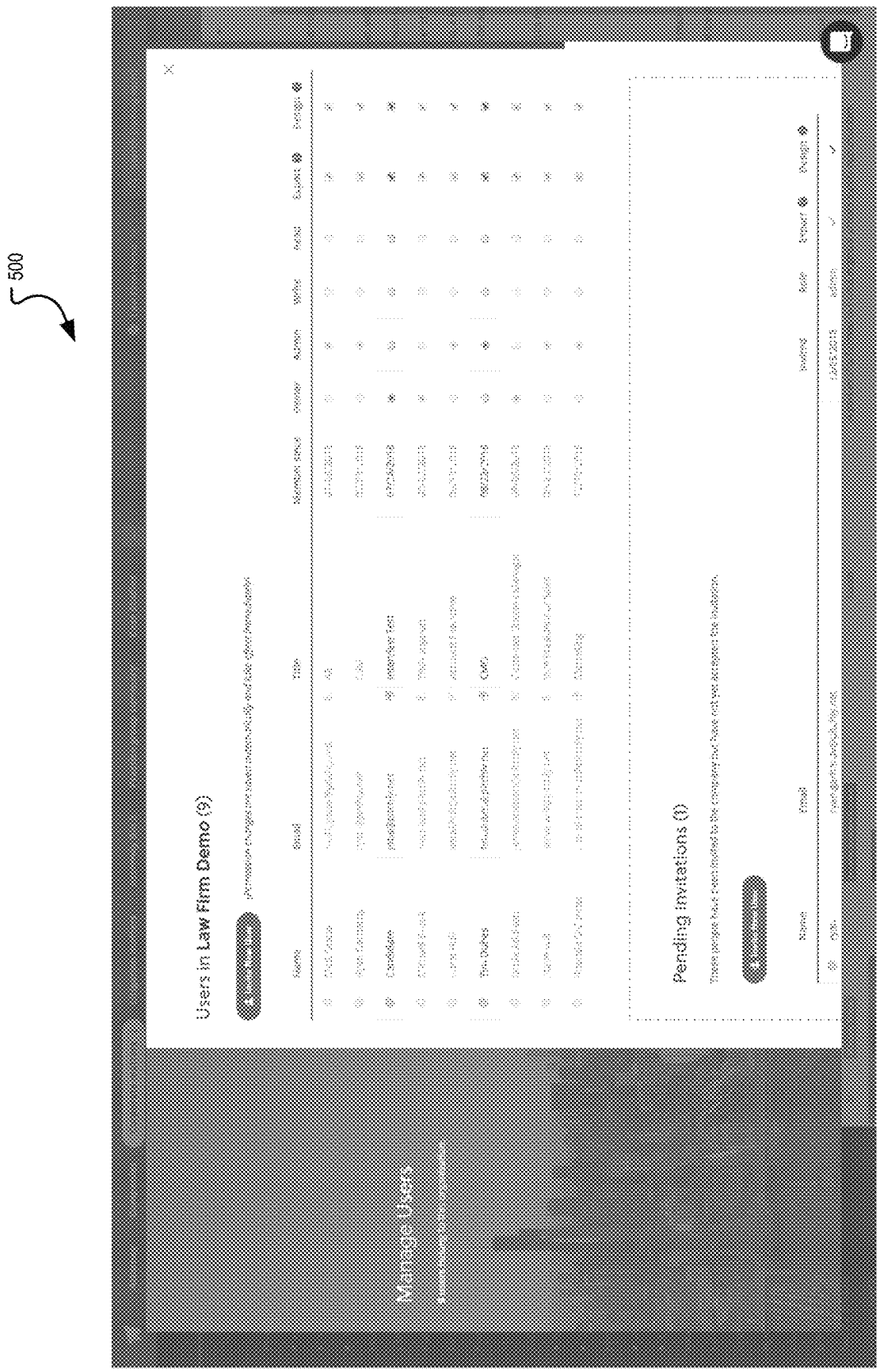

FIG. 5 shows another example user interface 500 generated by the remote data retrieval application 116 and transmitted from the data retrieval server computing device 102 to the client computing device 106 and displayed by the client computing device 106. As shown in FIG. 5, a user of the client computing device 106 may view and manage users that may have access to the remote data retrieval application 116. The user of the client computing device 106 may send invitations to one or more users that may have access to the remote data retrieval application 116. Each user may have particular permissions that allow a particular level of access to data in the database 108. A first user may have read-only access and a second user may have the ability to modify a certain set of data values. A third user may be an administrator and have the ability to modify all data values except primary key related values. There are nine users that have access to the application entitled "Law Firm Demo."

Figure 6:
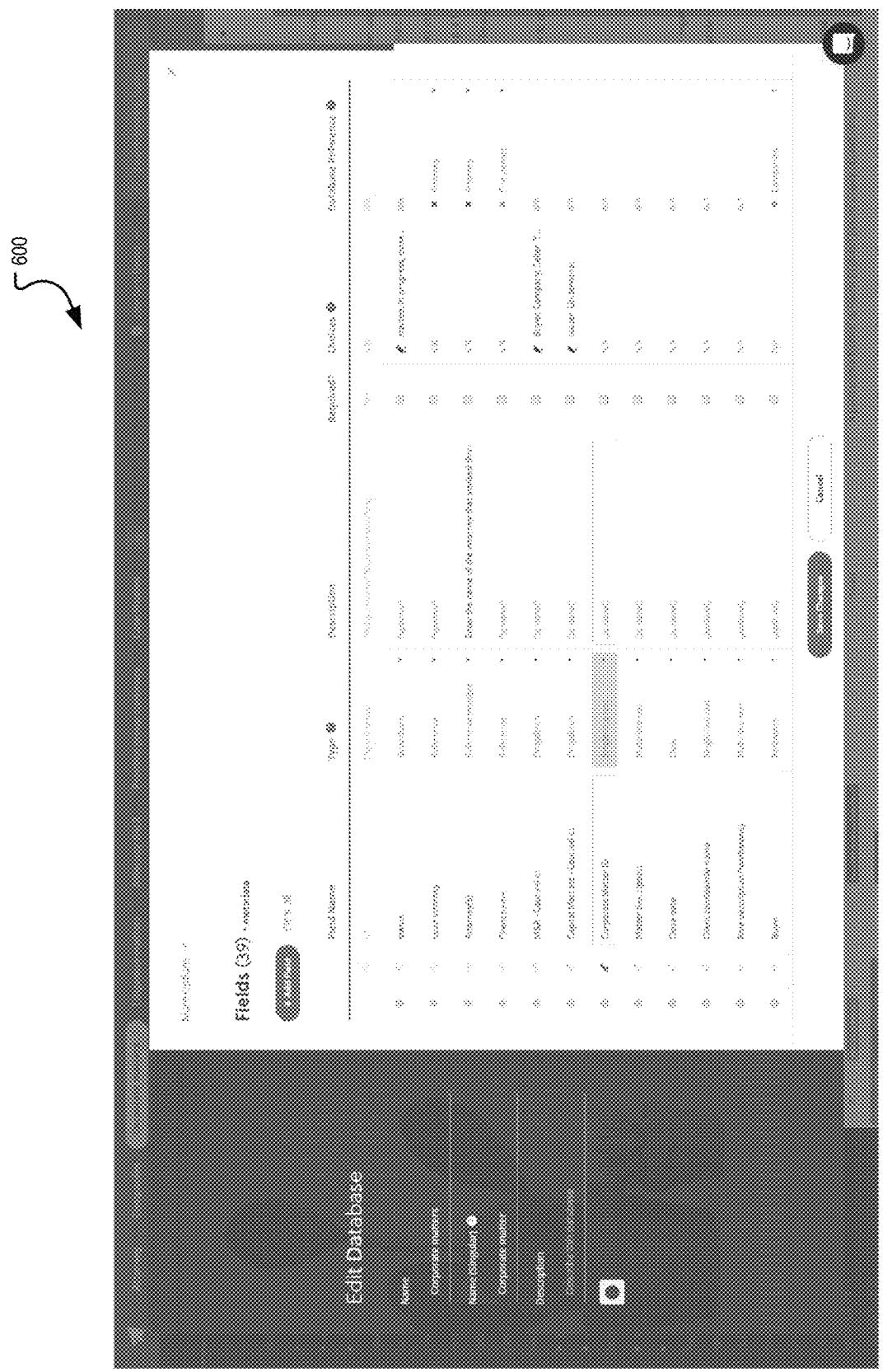

FIG. 6 shows another example user interface 600 generated by the remote data retrieval application 116 and transmitted from the data retrieval server computing device 102 to the client computing device 106 and displayed by the client computing device 106. As shown in FIG. 6, a user of the client computing device 106 may view and edit records that may be stored in the database 108. The user can view and edit field names in the database, data types, and descriptions, among others. In addition, as noted above, each user may have the particular permissions that may allow the user to view and/or modify certain data values.

Figure 7:
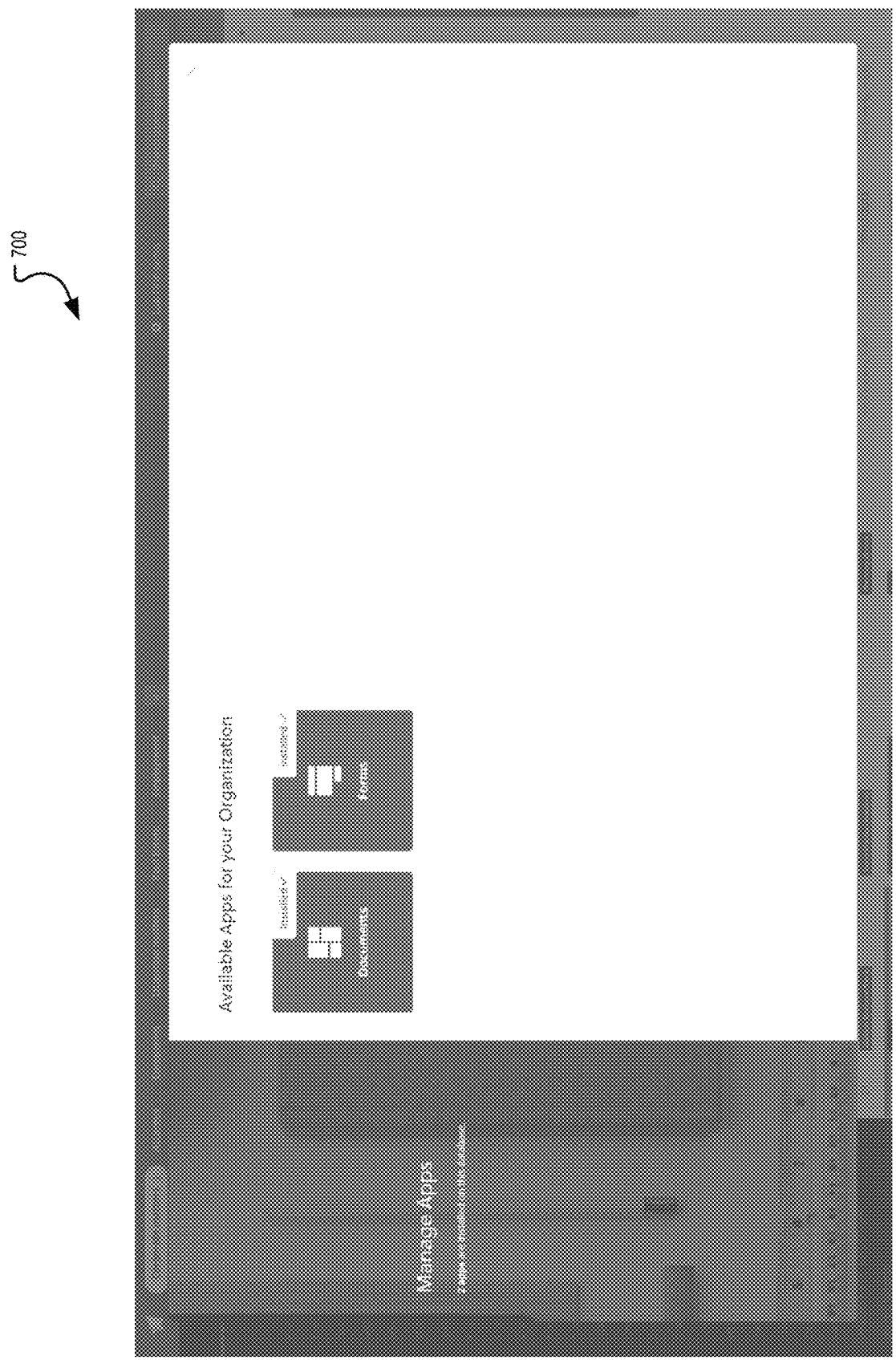

FIG. 7 shows another example user interface 700 generated by the remote data retrieval application 116 and transmitted from the data retrieval server computing device 102 to the client computing device 106 and displayed by the client computing device 106. As shown in FIG. 7, a user of the client computing device 106 may connect one or more applications available in an application library to the database 108. The user can connect or install a document application to the database 108 and also can connect or install a form application to the database 108.

Figure 8:
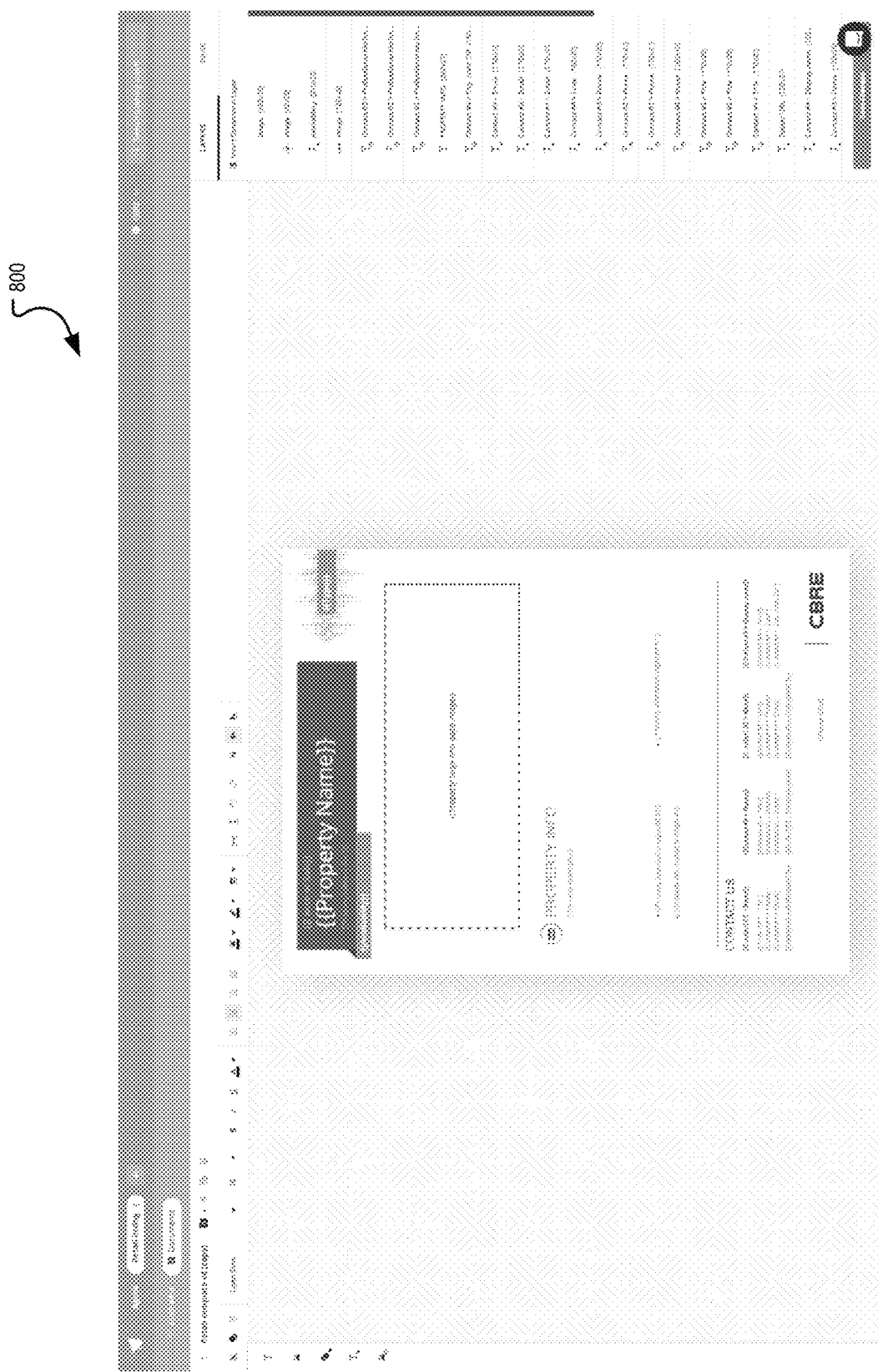

FIG. 8 shows another example user interface 800 generated by the remote data retrieval application 116 and transmitted from the data retrieval server computing device 102 to the client computing device 106 and displayed by the client computing device 106. As shown in FIG. 8, a user of the client computing device 106 can create a dynamic document using the document application. The document may be based on a template and may include at least one data placeholder for the at least one data value different from the primary key in the database 108. As noted above, the document creation module 212 can determine a change in the at least one data value different from the primary key in the database 108 and transmit the change in the at least one data value different from the primary key in the database 108 using the GraphQL API.

The user can use the user interface shown in FIG. 8 to design the document template and arrange the at least one data placeholder, other text, graphics, and other elements associated with the document. In certain instances, the user may apply conditional layers to the at least one data placeholder for the at least one data value, or conditional layers may be applied to static elements, such as text or images or other graphical elements, or a combination of both data placeholders and static elements. In certain instances, the user may want to display the at least one data value that may display depending on certain conditions. The data value may be an image such as a company logo or another type of image. In certain instances, the user may not want to display the image based on conditions that may be available in the database 108. As an example, the image may be associated with a confidential transaction with a customer that is not public knowledge. Based on the conditions, the document template may determine whether to display the image or not display the image. The document template may display a different image such as an image that indicates that the transaction is confidential.

Conditional layers include one or more conditional blocks. Each block represents a logical condition or conditional statement, which if true, will cause the layers inside that block to be rendered in the template with exception to other blocks within the same conditional layer. As a result, only that block's layers are rendered. A "default" block is also available inside the conditional layer, which will render its set of layers if no other block evaluates to true. The first block whose conditional statement evaluates to true is selected for rendering. If none are true, the default block is used.

A conditional statement may include one or more logical expressions strung together by logical operators. Collectively, the conditional statement evaluates to either a true or false value. Often times, logical expressions perform a comparison between variable data and a predefined value decided by the user, but it could also perform a comparison between two sets of variable data. "Layers" (e.g., not "conditional layers") can be any type of element available to the template. These may include variable data from a database (e.g., as a placeholder—text or image), static elements such as text or images, or shapes. Each layer may also be styled by the user through the interface. Style attributes may consist of font family, font size, font style, font color, horizontal and vertical alignment, background color, border color, and border thickness. The page "canvas" representing the base layer of the template may also have its own background color, border color and thickness, background image, and its size is user-configurable.

Figure 9:
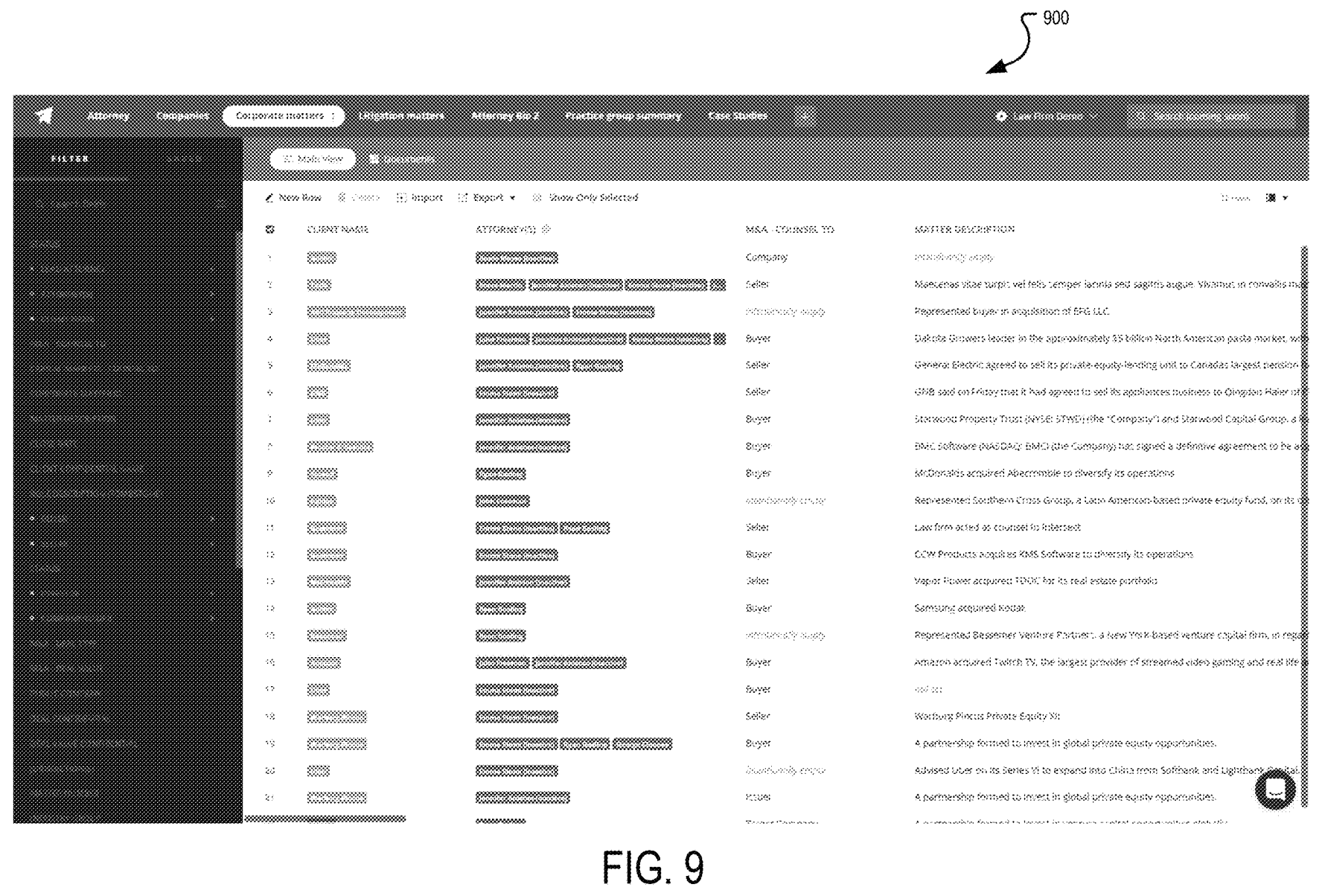

FIG. 9 shows another example user interface 900 generated by the remote data retrieval application 116 and transmitted from the data retrieval server computing device 102 to the client computing device 106 and displayed by the client computing device 106. As shown in FIG. 9, the user of the client computing device 106 may search through records available in the database 108 using relational filtering. Relational filtering allows a user to find information quickly that is based on relations between data in tables of the at least one database 108. Each table in the at least one database 108 can be linked together. As an example, a particular data value may be linked to a record in another table. A user may desire to search through all records in a table by at least one property of a linked record different from the primary key in that linked table/database. The user may, furthermore, filter by a sub-property of a linked record that is in a third table from the second linked record, displaying records from the first table matching the filter criteria across each relation. This process can be repeated across any number of relations recursively.

As an example, a particular employee in a company may be assigned to one or more projects and physically located in Chicago. A user can filter and display a list of employees that are employed in Chicago. The user may then filter and view one or more projects assigned to the employees in Chicago. The user can also continue to filter the one or more projects assigned to employees in Chicago and are related to a particular customer. The relational filtering is recursive and the user can continue to add additional filters. As the filters are added, the client computing device 106 may update the data that is displayed on the display based on the filters.

Figure 10:
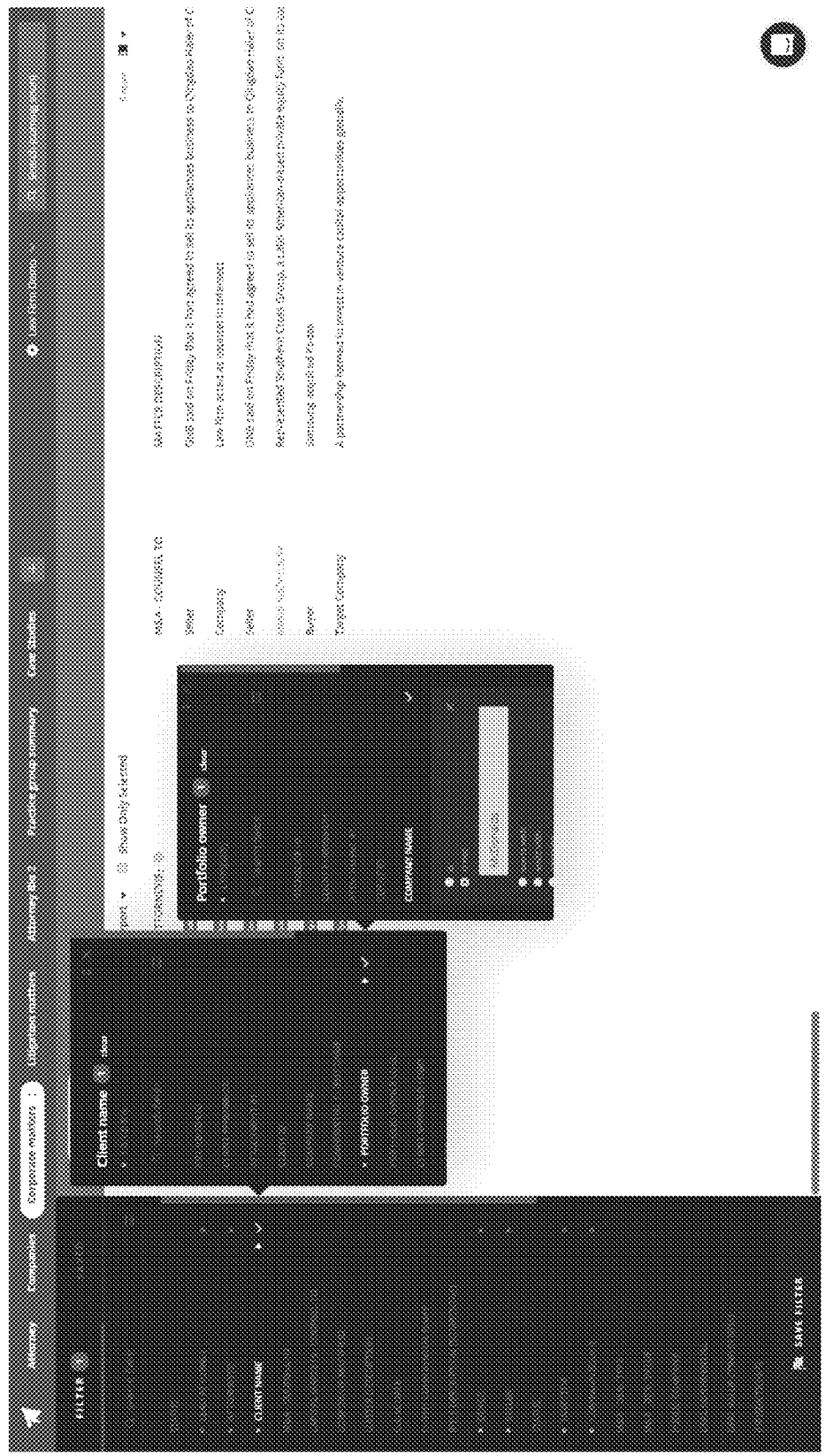
Figure 11:
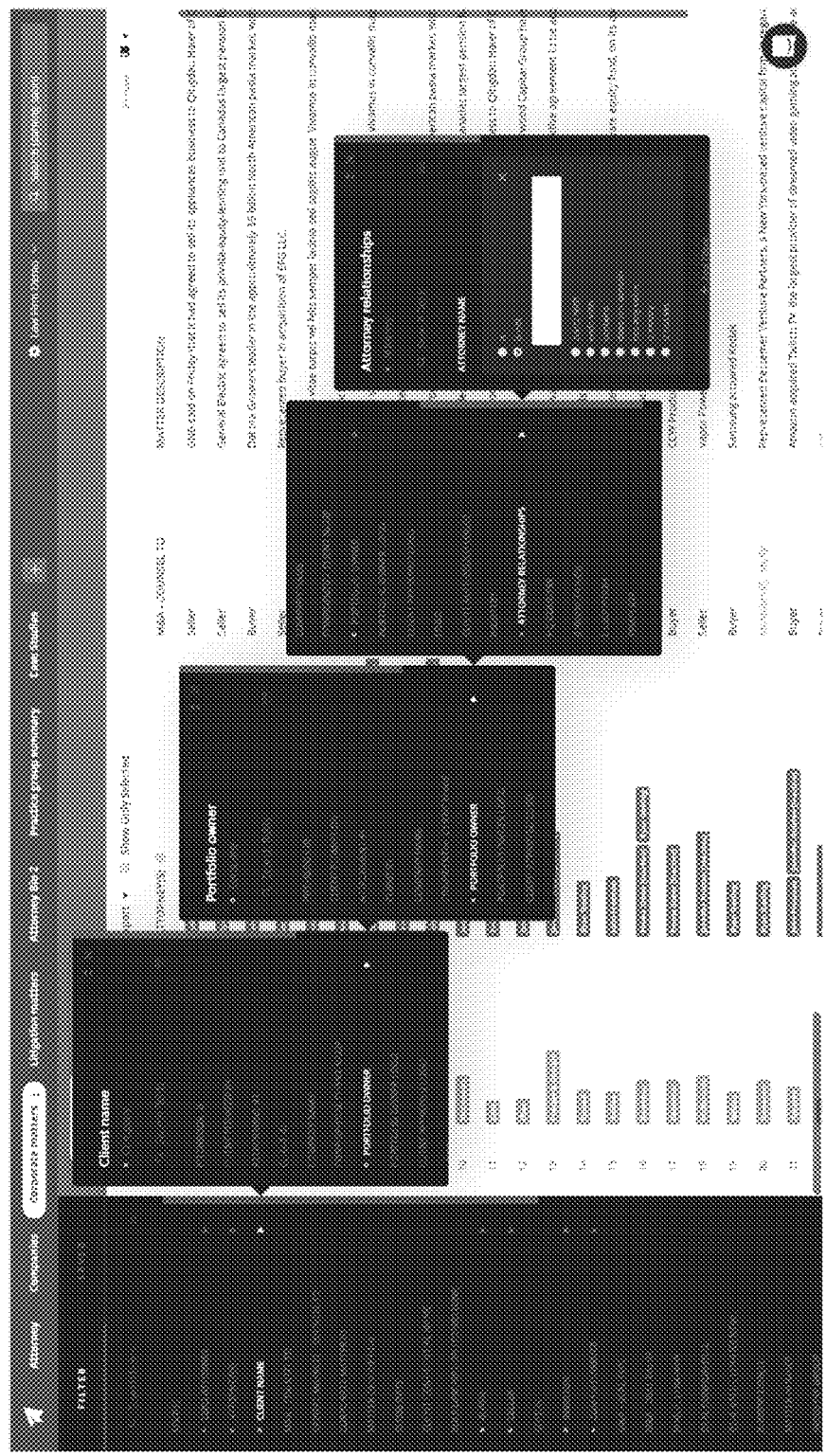
Figure 12:
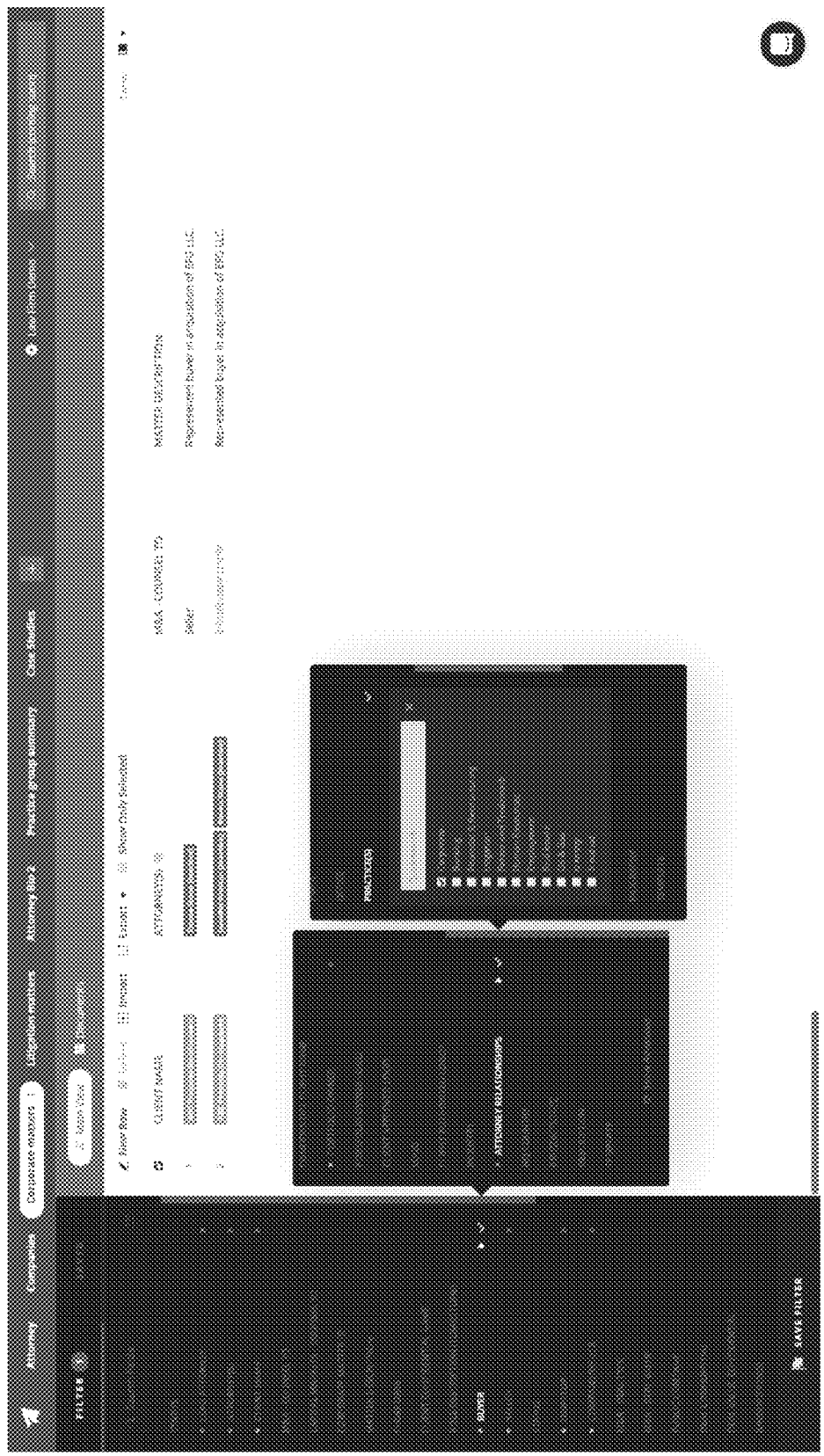

FIGS. 10-12 show example user interfaces 1000, 1100, and 1200 generated by the remote data retrieval application 116 and transmitted from the data retrieval server computing device 102 to the client computing device 106 and displayed by the client computing device. As shown in FIGS. 10-12, the user of the client computing device 106 may use relational filtering to view desired information associated with the base.

In FIG. 10, the user can filter by portfolio owner and then by company name where the company name is not McDonalds. In FIG. 11, the user can filter by client name, portfolio owner, and attorney relationships. The user can also set a condition on the attorney relationship such as one or more of is, is not, starts with, ends with, contains, does not contain, has any value, is empty, or is not set, among others. In FIG. 12, the user can filter by attorney relationships and then by practice (e.g., Corporate, Banking, Financial & Restructuring, Litigation, Patent and Trademark, Human Resources, Employment, Real Estate, or Oil & Gas). As shown in FIG. 12, the user can select to save the filter.

Figure 13:
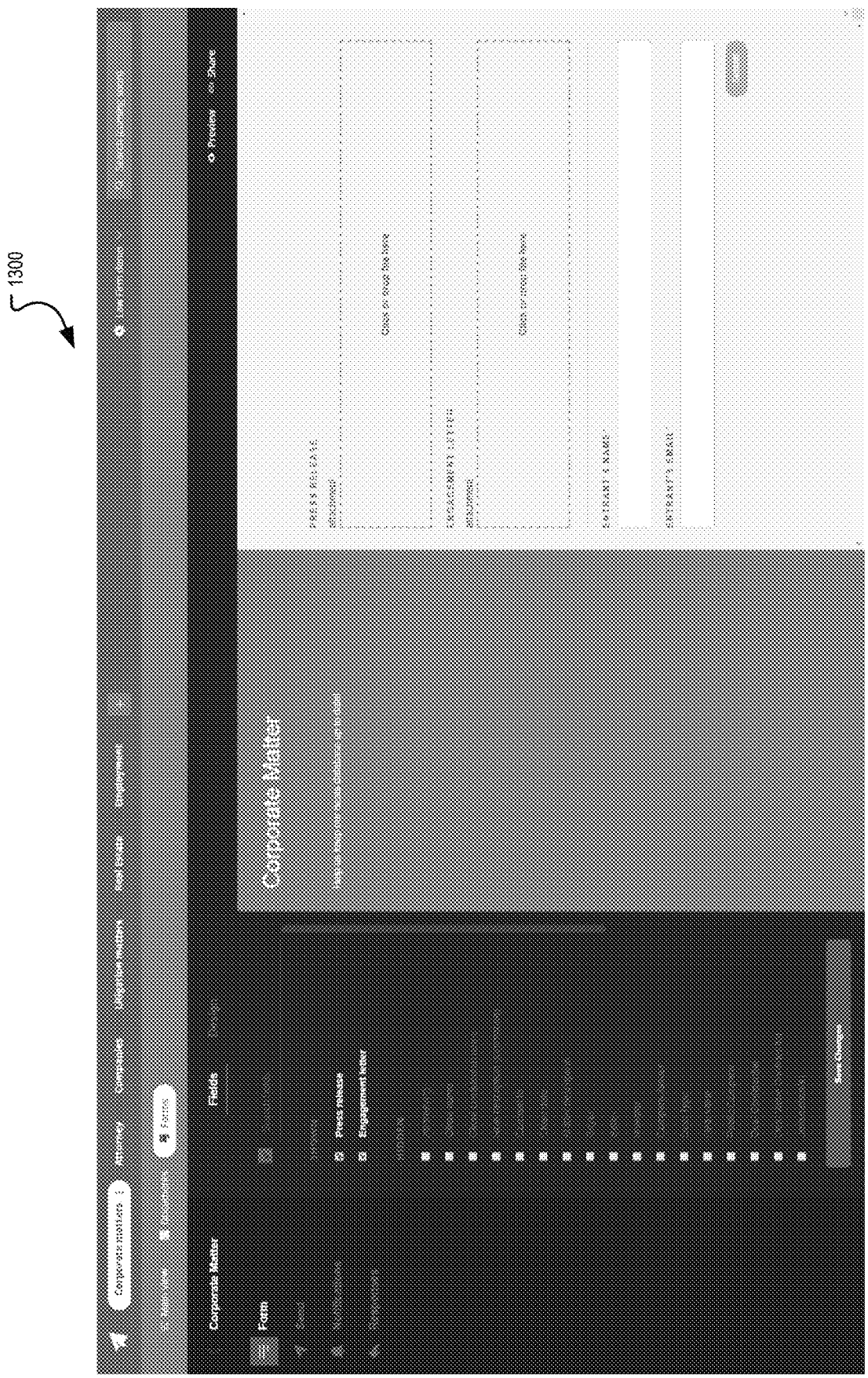

FIG. 13 shows another example user interface 1300 generated by the remote data retrieval application 116 and transmitted from the data retrieval server computing device 102 to the client computing device 106 and displayed by the client computing device 106. As shown in FIG. 13, the user of the client computing device 106 may create a form that includes one or more elements using the form application. As shown in FIG. 13, there is a press release with an associated file, an engagement letter with an associated file, an entrant's name text box, an entrant's email text box, and a submit button.

Figure 14:
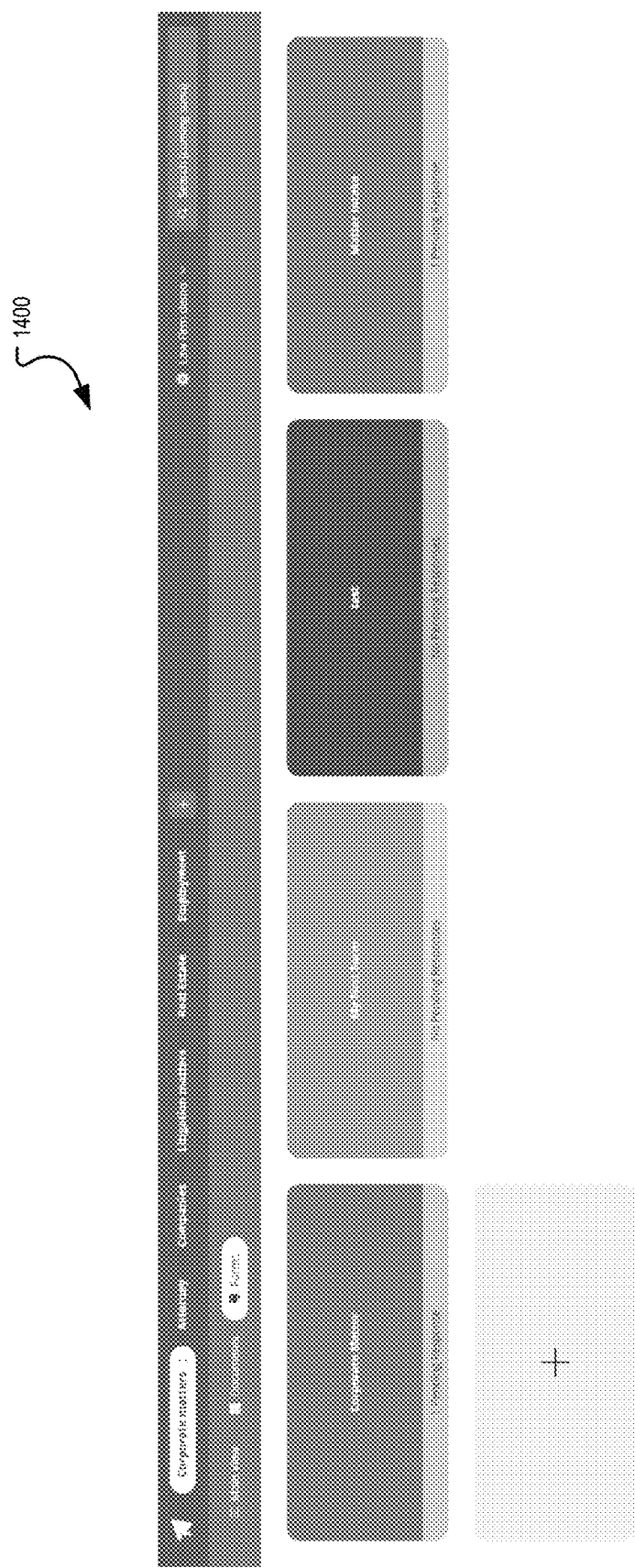

FIG. 14 shows another example user interface 1400 generated by the remote data retrieval application 116 and transmitted from the data retrieval server computing device 102 to the client computing device and displayed by the client computing device 106. As shown in FIG. 14, the user may manage one or more forms including a Corporate Matter form, a My First Form form, a test form, and a Matter Intake form.

Figure 15:
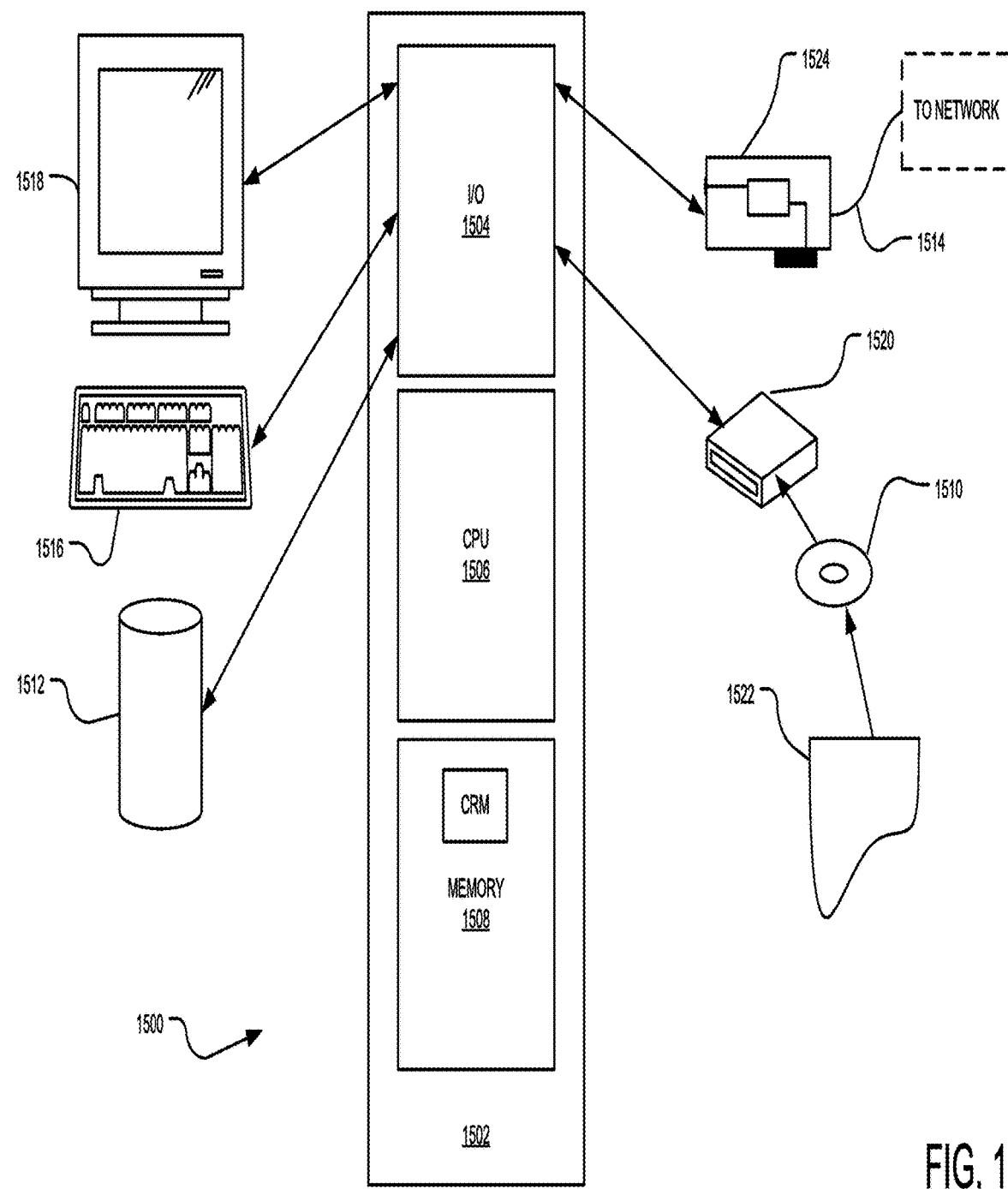
FIG. 15 illustrates a block diagram of a computing device according to an example embodiment.

FIG. 15 illustrates an example computing system 1500 that may implement various systems, such as the data retrieval server computing device 102, the remote server computing device 104, and the client computing device 106, and the methods discussed herein, such as process 300. A general purpose computer system 1500 is capable of executing a computer program product to execute a computer process. Data and program files may be input to the computer system 1500, which reads the files and executes the programs therein such as the remote data retrieval application 116. Some of the elements of a general purpose computer system 1500 are shown in FIG. 15 wherein a processor 1502 is shown having an input/output (I/O) section 1504, a central processing unit (CPU) 1506, and a memory section 1508. There may be one or more processors 1502, such that the processor 1502 of the computer system 1500 comprises a single central-processing unit 1506, or a plurality of processing units, commonly referred to as a parallel processing environment. The computer system 1500 may be a conventional computer, a server, a distributed computer, or any other type of computer, such as one or more external computers made available via a cloud computing architecture. The presently described technology is optionally implemented in software devices loaded in memory 1508, stored on a configured DVD/CD-ROM 1510 or storage unit 1512, and/or communicated via a wired or wireless network link 1514, thereby transforming the computer system 1500 in FIG. 15 to a special purpose machine for implementing the described operations.

The memory section 1508 may be volatile media, nonvolatile media, removable media, non-removable media, and/or other media or mediums that can be accessed by a general purpose or special purpose computing device. For example, the memory section 1508 may include non-transitory computer storage media and communication media. Non-transitory computer storage media further may include volatile, nonvolatile, removable, and/or non-removable media implemented in a method or technology for the storage (and retrieval) of information, such as computer/machine-readable/executable instructions, data and data structures, engines, program modules, and/or other data. Communication media may, for example, embody computer/machine-readable/executable, data structures, program modules, algorithms, and/or other data. The communication media may also include an information delivery technology. The communication media may include wired and/or wireless connections and technologies and be used to transmit and/or receive wired and/or wireless communications.

The I/O section 1504 is connected to one or more user-interface devices (e.g., a keyboard 1516 and a display unit 1518), a disc storage unit 1512, and a disc drive unit 1520. Generally, the disc drive unit 1520 is a DVD/CD-ROM drive unit capable of reading the DVD/CD-ROM medium 1510, which typically contains programs and data 1522. Computer program products containing mechanisms to effectuate the systems and methods in accordance with the presently described technology may reside in the memory section 1504, on a disc storage unit 1512, on the DVD/CD-ROM medium 1510 of the computer system 1500, or on external storage devices made available via a cloud computing architecture with such computer program products, including one or more database management products, web server products, application server products, and/or other additional software components. Alternatively, a disc drive unit 1520 may be replaced or supplemented by another storage medium drive unit. The network adapter 1524 is capable of connecting the computer system 1500 to a network via the network link 1514, through which the computer system can receive instructions and data. Examples of such systems include personal computers, Intel or PowerPC-based computing systems, AMD-based computing systems, ARM-based computing systems, and other systems running a Windows-based, a UNIX-based, or other operating system. It should be understood that computing systems may also embody devices such as Personal Digital Assistants (PDAs), mobile phones, tablets or slates, multimedia consoles, gaming consoles, set top boxes, etc.

When used in a LAN-networking environment, the computer system 1500 is connected (by wired connection and/or wirelessly) to a local network through the network interface or adapter 1524, which is one type of communications device. When used in a WAN-networking environment, the computer system 1500 typically includes a modem, a network adapter, or any other type of communications device for establishing communications over the wide area network. In a networked environment, program modules depicted relative to the computer system 1500 or portions thereof, may be stored in a remote memory storage device. It is appreciated that the network connections shown are examples of communications devices for and other means of establishing a communications link between the computers may be used.

In an example implementation, source code executed by the data retrieval server computing device 102, the remote server computing device 104, the client computing device 106, a plurality of internal and external databases, source databases, and/or cached data on servers are stored in memory of the data retrieval server computing device 102, memory of the remote server computing device 104, memory of the client computing device 106, or other storage systems, such as the disk storage unit 1512 or the DVD/CD-ROM medium 1510, and/or other external storage devices made available and accessible via a network architecture. The source code executed by the data retrieval server computing device 102, the remote server computing device 104, and the client computing device 106 may be embodied by instructions stored on such storage systems and executed by the processor 1502.

Some or all of the operations described herein may be performed by the processor 1502, which is hardware. Further, local computing systems, remote data sources and/or services, and other associated logic represent firmware, hardware, and/or software configured to control operations of the reversible anonymized data record identifier system 100 and/or other components. Such services may be implemented using a general purpose computer and specialized software (such as a server executing service software), a special purpose computing system and specialized software (such as a mobile device or network appliance executing service software), or other computing configurations. In addition, one or more functionalities disclosed herein may be generated by the processor 1502 and a user may interact with a Graphical User Interface (GUI) using one or more user-interface devices (e.g., the keyboard 1516, the display unit 1518, and the user devices 1504) with some of the data in use directly coming from online sources and data stores. The system set forth in FIG. 15 is but one possible example of a computer system that may employ or be configured in accordance with aspects of the present disclosure.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon executable instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may include, but is not limited to, magnetic storage medium, optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic executable instructions.

The description above includes example systems, methods, techniques, instruction sequences, and/or computer program products that embody techniques of the present disclosure. However, it is understood that the described disclosure may be practiced without these specific details.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A system comprising:
   a data retrieval server including a non-transitory computer-readable storage medium and at least one processor to execute instructions stored in the non-transitory computer-readable storage medium, the instructions causing the at least one processor to:
   extract at least one data value from a record in a remote data store as a primary key that uniquely represents the record in the remote data store;
   encrypt the primary key using a randomly generated secret key and an initialization vector to create a reversible public identifier that represents the primary key and the record in the remote data store;
   store the secret key in a local data store associated with the data retrieval server;
   transmit the reversible public identifier from the data retrieval server to a client computing device prior to the client computing device requesting data from the record;
   receive the reversible public identifier from the client computing device in a request for data from the record;
   retrieve the secret key for the record from the local data store;
   decrypt the reversible public identifier using the secret key from the local data store to determine the primary key;
   query at least one data value different from the primary key in the remote data store using the primary key; and
   receive the at least one data value different from the primary key from the remote data store for transmission to the client computing device.

2. The system of claim 1, the at least one processor further to receive a request from a client computing device to install an application associated with the remote data store and install the application.

3. The system of claim 2, the at least one processor further to generate a document template using the application and insert at least one data placeholder in the document template for the at least one data value different from the primary key in the remote data store.

4. The system of claim 2, the at least one processor further to determine a change in the at least one data value different from the primary key in the remote data store and transmit the change in the at least one data value different from the primary key in the remote data store using at least one GraphQL API.

5. The system of claim 1, the at least one processor further to encrypt the primary key using Advanced Encryption Standard (AES).

6. The system of claim 1, the at least one processor further to insert the reversible public identifier in a JavaScript Object Notation (JSON) document and transmit the JSON document.

7. The system of claim 1, wherein the remote data store comprises a structured query language (SQL) database.

8. A method comprising:
extracting, by at least one processor of a data retrieval server, at least one data value from a record in a remote data store as a primary key that uniquely represents the record in the remote data store;
encrypting, by the at least one processor, the primary key using a randomly generated secret key and an initialization vector to create a reversible public identifier that represents the primary key and the record in the remote data store;
storing, by the at least one processor, the secret key in a local data store associated with the data retrieval server;
transmitting, by the at least one processor, the reversible public identifier to a client computing device prior to the client computing device requesting data from the record;
receiving, by the at least one processor, a request for data from the record including the reversible public identifier;
decrypting, by the at least one processor, the reversible public identifier using the secret key from the local data store to determine the primary key;
querying, by the at least one processor, at least one data value different from the primary key in the remote data store using the primary key; and
receiving, by the at least one processor, the at least one data value different from the primary key from the remote data store for transmission to the client computing device.

9. The method of claim 8, further comprising receiving a request from a client computing device to install an application associated with the remote data store and install the application.

10. The method of claim 9, further comprising generating a document template using the application and inserting at least one data placeholder in the document template for the at least one data value different from the primary key in the remote data store.

11. The method of claim 9, further comprising determining a change in the at least one data value different from the primary key in the remote data store and transmitting the change in the at least one data value different from the primary key in the remote data store using a GraphQL API.

12. The method of claim 8, further comprising encrypting the primary key using Advanced Encryption Standard (AES).

13. The method of claim 8, further comprising inserting the reversible public identifier in a JavaScript Object Notation (JSON) document and transmit the JSON document.

14. The method of claim 8, wherein the remote data store comprises a structured query language (SQL) database.

15. A non-transitory computer-readable storage medium, having instructions stored thereon that, when executed by a computing device cause the computing device to:
extract at least one data value from a record in a remote data store as a primary key that uniquely represents the record in the remote data store;
encrypt the primary key using a randomly generated secret key and an initialization vector to create a reversible public identifier that represents the primary key and the record in the remote data store;
store the secret key in a local data store associated with the data retrieval server;
transmit the reversible public identifier from the data retrieval server to a client computing device prior to the client computing device requesting data from the record;
receive the reversible public identifier from the client computing device in a request for data from the record;
retrieve the secret key for the record from the local data store;
decrypt the reversible public identifier using the secret key from the local data store to determine the primary key;
query at least one data value different from the primary key in the remote data store using the primary key; and
receive the at least one data value different from the primary key from the remote data store for transmission to the client computing device.

16. The non-transitory computer-readable storage medium of claim 15, the operations further comprising receiving a request from a client computing device to install an application associated with the remote data store and install the application.

17. The non-transitory computer-readable storage medium of claim 16, the operations further comprising generating a document template using the application and inserting at least one data placeholder in the document template for the at least one data value different from the primary key in the remote data store.

18. The non-transitory computer-readable storage medium of claim 16, the operations further comprising determining a change in the at least one data value different from the primary key in the remote data store and transmitting the change in the at least one data value different from the primary key in the remote data store using a GraphQL API.

19. The non-transitory computer-readable storage medium of claim 15, the operations further comprising encrypting the primary key using Advanced Encryption Standard (AES).

20. The non-transitory computer-readable storage medium of claim 15, the operations further comprising inserting the reversible public identifier in a JavaScript Object Notation (JSON) document and transmit the JSON document.

21. The non-transitory computer-readable storage medium of claim 15, wherein the remote data store comprises a structured query language (SQL) database.

* * * * *